Patented Dec. 28, 1943

2,337,947

UNITED STATES PATENT OFFICE 2,337,947

MANUFACTURE OF RENNET

Basil Duperier Thornley and Stanley Hilton, Wilmslow, England, assignors to Benger's Limited, Holmes Chapel, Cheshire, England No Drawing. Application June 27, 1940, Serial No. 342,686. In Great Britain July 22, 1939

15 Claims. (Cl. 195—66)

This invention relates to improvements in the manufacture of rennet for coagulating milk.

It has been shown by Kleiner & Tauber (J. Biol. Chem. 1932 96 755) that a neutral solution of rennin rapidly deteriorates but that any pro-rennin or precursor of rennin can be activated by HCl and rapidly so at pH 1. However, under the conditions in which they worked, particularly using a 2% suspension of calcium carbonate in water at about pH 7 as the extracting agent, their results are of no significance in the manufacture of commercial preparations of rennet. Again Keil and Stout (British Patent Specification No. 503,730) have proposed a method of obtaining rennin with reduced impurities by a process of separating rennin from an aqueous extract thereof containing mucin, which comprises salting out the rennin while the extract is at a pH of about 4.5 such that the mucin therein is markedly soluble but the rennin is not. A suitable extract is made by treating calf stomachs with water acidified to a pH of about 1, such extract being partially neutralized to reduce its acidity to about pH 4.5 before saturating the solution with sodium chloride. In contradistinction our purpose is to obtain an extract rich in protective substances as well as rennin and pro-rennin and to produce therefrom a solid preparation containing highly active rennet together with sufficient protective substances.

For the purpose of our present invention we employ an extract of calves' stomachs, using an aqueous solution of a suitable salt as extracting agent. Sodium chloride, sodium sulphate, ammonium chloride, ammonium sulphate and magnesium sulphate in 6% aqueous solution have been found to give satisfactory results. In the case of sodium chloride, 10% is the highest concentration which will extract satisfactorily. With all the salts named a concentration of from 3% to 10% gives a good extraction for our purpose. The efficiency of the extract falls off as the concentration of the salt solution is lowered below about 3% and we do not, therefore, normally employ extracting solutions whereof the salt concentration lies below about 3. The pH during extraction may be between about 4.6 and 7.0. Below the lower limit the protective substances are almost insoluble and will, therefore, not be present as desired in the resulting extract, whilst above the upper limit the enzyme begins to be inactivated. The extract may be cleared by any of the usual methods such as filtering after the addition of clearing agents.

We have discovered that by taking such an extract and treating it with a suitable acid to a pH of less than about 3.6 and preferably about 1.5, the acidity not being so great, however, as to damage the product, a precipitate is thrown down in presence of a sufficient amount of sodium chloride or other suitable salt such as any of those aforementioned, which precipitate contains a high proportion of active rennet and exhibits remarkable keeping properties, more particularly if allowed to stand in an acid solution of less than about pH 2 for some considerable time, say from one to three days, before separating the solid. There is no advantage in acidifying the extract beyond about pH 1.5 although if desired the pH can be taken as low as 0.5 without detriment to the rennet activity. The acidified extract from which the precipitation has been obtained is generally suitable for use as the acid solution in which the precipitate is allowed to stand, the precipitate being left in the acidified extract for the required time before separation therefrom. Satisfactory results have been obtained using hydrochloric acid, nitric acid, sulphuric acid and trichloracetic acid, but acids which are not highly ionized in aqueous solution and capable of giving rise to a low pH cannot be considered suitable.

The extract before acidification may contain from about 3% to about 10% of sodium chloride or other suitable salt. If desired, the concentration of salt in the extract may be increased within or above this range by the addition of more salt to bring about partial precipitation before acidification, precipitation being completed by the subsequent addition of the acid. Alternatively, acidification may be followed by a salting out operation, in which use may be made of any of the afore-mentioned salts.

By carrying out this improved method of preparing rennet, a highly active product is obtained at normal temperature if the precipitate is left in contact with the acid solution for a few hours. Furthermore the product is sterile so that the use of preservatives is unnecessary; also sufficient protective substances are precipitated with the rennet. Both these last mentioned factors contribute to the indefinite maintenance of the activity of the dried product which is also found to be stable at an elevated temperature of say 60°. Other advantages of acidification according to the present invention are the elimination of pepsin, and the formation of a flocculent precipitate containing the active enzyme and protective substances which can thus be easily separated.

Normally brine (common salt solution) of concentration 6% will be used as extracting agent and hydrochloric acid for acidification with additional common salt added to saturation as precipitating or salting out agent. With an extract prepared from dilute brine subsequently acidified to a low pH value, salting out may prove unnecessary, an adequate precipitation being obtained without it. If a liquid preparation is desired the precipitate can be re-dissolved in any suitable solvent such as brine solution, dilute alcohol or glycerol.

The following are practical examples of the carrying out of our process—

Example 1

6700 kg. of dried calves' stomachs are extracted with 2300 litres of 6% salt solution for five days at room temperature. The hydrogen ion concentration of this mixture will be about pH 5.2. The extract is then strained from the bulk of the calves' stomachs and concentrated hydrochloric acid is added to the extent of 22.2 litres per 1000 litres of extract or such amount as will raise the hydrogen ion concentration to pH 1.6. The precipitate is allowed to settle for about three days and is then filtered off and pressed to eliminate as much salt solution as possible. The wet solid is dried at low temperature and a yield of about 22.2 kg. per 1,000 litres of extract is obtained.

Example 2

27 kg. of dried calves' stomachs are extracted for six days with 91 litres of 6% NaCl solution. The extract is then strained and filtered. The hydrogen ion concentration of this extract is about pH 5.2. 10.9 kg. of salt are dissolved in 54.5 litres of the extract. 1.188 litres of concentrated HCl are added and gently stirred into the solution, which is allowed to stand undisturbed at room temperature for three days. It is immaterial whether the salt is added before or after the extract has been acidified. 35.5 litres of clear inactive liquor are run off and the wet precipitate filtered and collected. The solid is pressed in a very close filter cloth and finally vacuum dried at low temperature. 1.4 kg. of active dry solid are obtained from 54.5 litres of extract.

Example 3

500 ml. of brine extract of rennet are prepared by extracting 1.6 kg. of dried calves' stomachs with 6% salt solution. The salt concentration is adjusted to 26%. After standing about three days the pH is adjusted from 5.4 to 1.5 with concentrated hydrochloric acid. On addition of the acid a copious precipitate is formed. The mixture is allowed to stand undisturbed for three days. The solution is then filtered and the precipitate collected and dried in vacuo over calcium chloride. 20 grams of dry and active precipitate are obtained.

Example 4

1000 ml. of brine extract are prepared by extracting dried calves' stomachs with 6% sodium chloride solution. The pH of the extract is adjusted from about 5.2 to 1.5 by the addition of 14.0 grams of trichloracetic acid. The copious precipitate which forms is allowed to stand undisturbed for three days. The clear liquor is decanted, leaving the fully active precipitate.

Example 5

27 kg. of dried rennets are extracted for five days with 91 litres of 6% $Na_2SO_4 1H_2O$ previously adjusted with $H_2SO_4$ to pH 5.4. The extract is strained and filtered. The pH of the solution is adjusted by the addition of dilute sulphuric acid to 1.3. The precipitate which forms is allowed to stand for three days. The clear liquor is run off and the fully activated precipitate collected.

We claim:

1. A process for the manufacture of rennet which consists in extracting calves' stomachs with an aqueous salt solution of a metal from the group consisting of ammonium, alkali metals, and alkaline earth metals, the said salt having a concentration between 3% and 10% at a pH between 4.6 and 7.0, then adjusting the pH not to exceed 3.6 with acid, and separating the precipitated solid.

2. A process for the manufacture of a rennin-containing milk coagulant which comprises extracting calves' stomachs at a pH between about 4.6 and 7.0—with an aqueous solution of a salt of a metal selected from the group consisting of ammonium, alkali metals, and alkaline earth metals, the said salt ranging in concentration from an effective percentage up to about 10%, thereafter separating the liquid from the undissolved portion of the stomach tissues, mixing with the separated liquid a highly dissociable acid in amount sufficient to bring the pH to a point below about 3.6, and separating the resulting precipitate from the liquid.

3. The process as defined in claim 2, plus the additional step of allowing the precipitate to stand, for a period up to about three days, in contact with the acidulated liquid before separation of the precipitate therefrom.

4. The process as defined in claim 2, wherein the acidified extract is adjusted to a pH about 1.5.

5. The process as defined in claim 2, wherein the concentration of salt in the extracting liquid is within the range from about 3% to about 10%.

6. The process as defined in claim 2, wherein the salt used for extraction is selected from the group consisting of sodium chloride, sodium sulphate, ammonium chloride, ammonium sulphate, and magnesium sulphate.

7. The process as defined in claim 2, wherein the acid is selected from the group consisting of hydrochloric acid, nitric acid, sulphuric acid, and trichloracetic acid.

8. The process as defined in claim 2, plus the additional step of allowing the precipitate to stand for a period up to about three days, in contact with an acid solution having a pH not exceeding 2.

9. A process for the manufacture of a rennin-containing milk coagulant which comprises, extracting calves' stomachs—at a pH between about 4.6 and 7.0—with an aqueous solution of a salt of a metal selected from the group consisting of ammonium, alkali metals, and alkaline earth metals, the said salt ranging in concentration from an effective percentage up to about 10%, thereafter separating the liquid from the undissolved portion of the stomach tissues, mixing with the separated liquid a highly dissociable acid, in amount sufficient to bring the pH to a point below about 3.6, and more of the salt used in the foregoing step of extraction to augment the precipitating action of said acid, and separating the resulting precipitate from the liquid.

10. The process as defined in claim 9, plus the additional step of allowing the precipitate to stand, for a period up to about three days, in contact with the acidulated liquid before separation of the precipitate therefrom.

11. The process as defined in claim 9, wherein the acidified extract is adjusted to a pH about 1.5.

12. The process as defined in claim 9, plus the additional step of allowing the precipitate to stand, for a period up to about three days, in contact with an acid solution having a pH not exceeding 2.

13. The process as defined in claim 9, wherein the concentration of salt in the extracting liquid is within the range from about 3% to about 10%.

14. The process as defined in claim 9, wherein the salt used for extraction is selected from the group consisting of sodium chloride, sodium sulphate, ammonium chloride, ammonium sulphate and magnesium sulphate.

15. The process as defined in claim 9, wherein the acid is selected from the group consisting of hydrochloric acid, nitric acid, sulphuric acid, and trichloracetic acid.

BASIL DUPERIER THORNLEY.
STANLEY HILTON.